(12) United States Patent
Kim

(10) Patent No.: US 7,163,295 B2
(45) Date of Patent: Jan. 16, 2007

(54) PROJECTOR HAVING HEAT PIPE

(75) Inventor: Won-nyun Kim, Kwacheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/840,381

(22) Filed: May 7, 2004

(65) Prior Publication Data

US 2005/0030483 A1    Feb. 10, 2005

(30) Foreign Application Priority Data

Aug. 4, 2003    (KR)    ............ 10-2003-0053836

(51) Int. Cl.
*G03B 21/16*    (2006.01)
(52) U.S. Cl. .................. 353/52; 353/119; 348/748
(58) Field of Classification Search ............ 353/54, 353/60, 61, 85, 81, 119, 52
See application file for complete search history.

(56) References Cited

U.S. PATENT DOCUMENTS 6,805,448 B1 *  10/2004  Yokoyama et al. .......... 353/85
6,814,442 B1 *  11/2004  Okuyama et al. ........... 353/20
2004/0218390 A1 *  11/2004  Holman et al. ............ 362/245
2005/0152146 A1 *  7/2005  Owen et al. ............... 362/294

FOREIGN PATENT DOCUMENTS

| JP | 3-269455 | 12/1991 |
| JP | 6-266957 | 9/1994 |
| JP | 6-266958 | 9/1994 |
| JP | 6-271682 | 9/1994 |
| KR | 10-188211 | 1/1999 |
| KR | 20-182460 | 3/2000 |
| KR | 2000-14425 | 7/2000 |
| KR | 20-222849 | 2/2001 |
| KR | 2003-57751 | 7/2003 |

* cited by examiner

*Primary Examiner*—W. B. Perkey
*Assistant Examiner*—Andrew Sever
(74) *Attorney, Agent, or Firm*—Staas & Halsey LLP

(57) ABSTRACT

A projector having an optical engine, the optical engine including: an optical synthesizer; a plurality of display devices corresponding to the optical synthesizer; a plurality of light sources emitting light; a light guide plate provided between each light source and each display device; and a heat pipe contacting the light sources to reduce a temperature deviation between the light sources.

14 Claims, 5 Drawing Sheets

PROJECTOR HAVING HEAT PIPE

CROSS-REFERENCE TO RELATED APPLICATIONS

This application claims the benefit of Korean Patent Application No. 2003-053836, filed Aug. 4, 2003, in the Korean Intellectual Property Office, the disclosure of which is incorporated herein by reference.

BACKGROUND OF THE INVENTION

1. Field of the Invention

The present invention relates to a projector, particularly to a projector having a simple structure, to prevent a phase shift caused by a temperature difference between a plurality of light sources and to easily control temperatures of the light sources.

2. Description of the Related Art

A projector generally displays a desired picture by projecting image beams onto a screen, and is applied in a projection television having a similar projecting apparatus to form a picture.

The projector may be either a transparent-type projector to form a picture with light passing through a display device, or a reflection-type projector to form a picture onto a screen with light reflected by the display device.

A liquid crystal projector using an LCD panel as the display device of the projector has been developed. As various technologies are developed for an optical lamp device affecting color and resolution of a displayed picture, the liquid crystal projector generally may be either an SLPS (single LCD panel system) using one LCD panel, or a TLPS (triple LCD panel system) to split light from the optical lamp device into three primary colors and project the light using the LCD panels corresponding to the three primary colors.

FIG. 1 is a schematic view of a projector according to a conventional TLPS method. As illustrated, the projector using three LCD panels includes a light source 100 to emit light, two fly-eye lenses 200 to synthesize and split the light emitted from the light source 100, and a PBS array 300. The projector further includes two primary light collection lenses 400, four total reflection mirrors 500, two dichroic mirrors 510, a magnifying lens 520, and secondary light collection lenses 600a, 600b, and 600c to improve the straightness of the light reflected by the mirrors. The projector further includes three LCD panels 610a, 610b, and 610c to transform the light having the straightness improved by the secondary light collection lenses 600a, 600b, and 600c into respective colored lights having color signals R, G, and B, an optical synthesizer 700 to synthesize the colored lights having color signals R, G, and B from the LCDs 610a, 610b, and 610c, and a projection lens 800 to magnify and project the light synthesized by the optical synthesizer 700.

An operation of the projector having the above configuration will be described hereinbelow. The light emitted from the light source 100 is synthesized and split through the fly-eye lenses 200, the PBS array 300, the primary light collection lenses 400, the total reflection mirror 500, the dichroic mirrors 510, and the magnifying lens 520. Also, the light split by the dichroic mirrors 510 goes through a light modulation process by the LCD panels 610a, 610b, and 610c representing the color signals R, G, and B, respectively.

The respective colored lights representing the color signals R, G, and B by the LCD panels 610a, 610b, and 610c are synthesized by the optical synthesizer 700. The light synthesized by the optical synthesizer 700 is magnified and projected through the projection lens 800.

However, the projector having the above configuration has a disadvantage because a structure thereof becomes complicated and the brightness decreases due to decrease in a transmission rate of the light.

To solve this problem, Korean Patent First Publication No. 2003-57751 illustrates a projection display apparatus using an LED as a light source and providing individual lights to respective LCD panels. However, since such configuration also requires a plurality of LEDs (light emitting diodes) as the light source, a temperature difference among the plurality of LEDs causes a problem such as a phase shift which shifts the image.

SUMMARY OF THE INVENTION

Accordingly, it is an aspect of the present invention to provide a projector having a simple structure, to prevent a phase shift caused by a temperature difference between a plurality of light sources and control temperature of the plurality of light sources easily.

Additional aspects and advantages of the invention will be set forth in part in the description which follows and, in part, will be obvious from the description, or may be learned by practice of the invention.

The foregoing and/or other aspects of the present invention are achieved by providing a projector having an optical engine, the optical engine including: an optical synthesizer; a plurality of display devices corresponding to the optical synthesizer; a plurality of light sources each in a respective vicinity of the plurality of display devices to emit light; a light guide plate provided between each light source and each respective display device; and a heat pipe contacting the light sources to reduce a temperature deviation between the light sources.

According to an aspect of the invention, the optical engine further includes: a temperature sensor installed on the heat pipe; a cooling part to cool the light sources; and a controller to control the cooling part according to a signal from the temperature sensor.

According to an aspect of the invention, the optical synthesizer is shaped like a cube and three of the display devices are provided corresponding to respective faces of the optical synthesizer.

According to an aspect of the invention, each light source includes an LED.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENT

Figure 1:
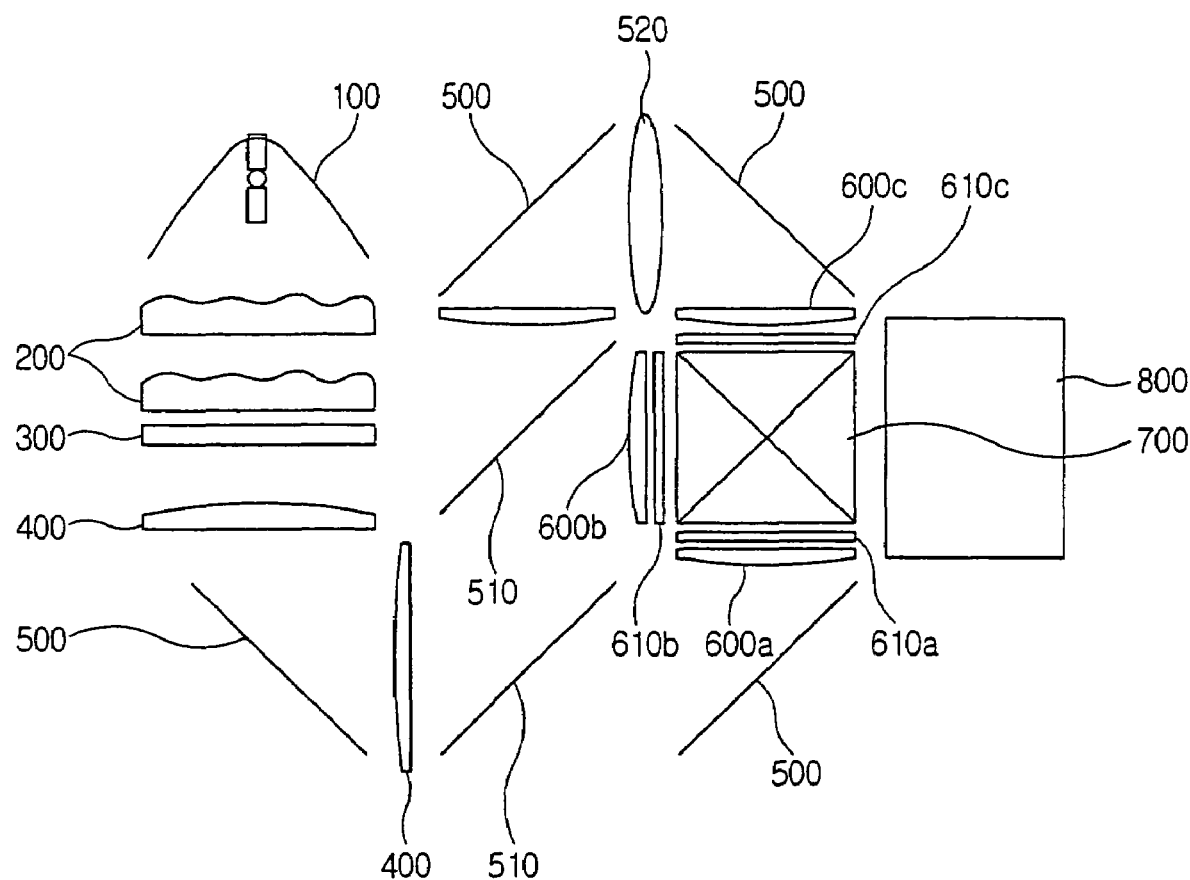
FIG. 1 is a schematic view illustrating a conventional projector.

Reference will now be made in detail to the embodiments of the present invention, an example of which is illustrated in the accompanying drawings, wherein like reference numerals refer to the like elements throughout. The embodiment is described below to explain the present invention by referring to the figures.

Figure 2:
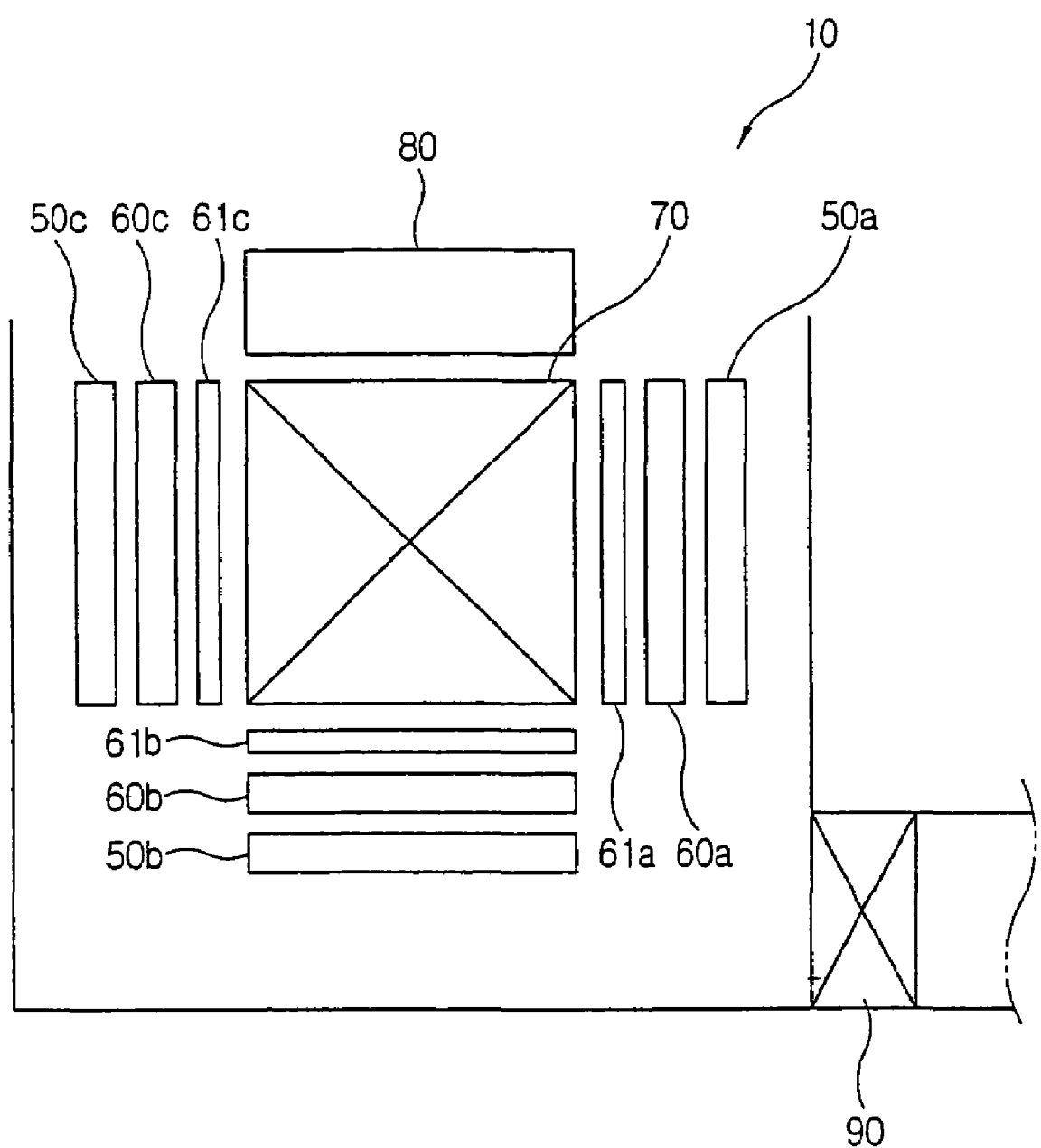
FIG. 2 is a schematic view illustrating a projector according to an embodiment of the present invention.
Figure 3:
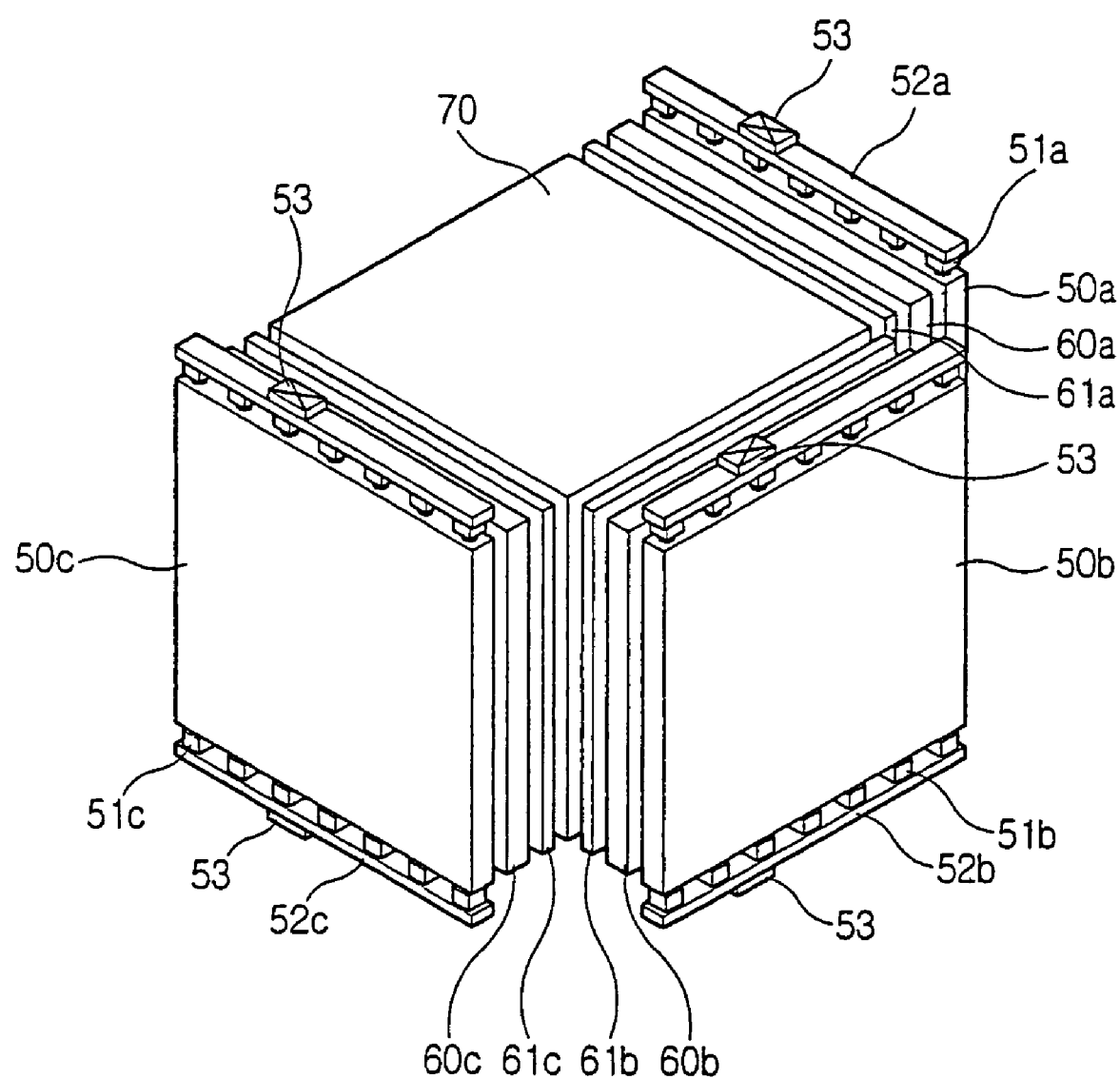
FIG. 3 is a perspective view illustrating an optical engine of the projector of FIG. 2.

FIG. 2 is a schematic view illustrating a projector according to an embodiment of the present invention, and FIG. 3 is a perspective view illustrating an optical engine of the projector according to FIG. 2. As illustrated in the drawings, the projector includes an optical engine 10, and a cooling part 90 to cool the optical engine 10. The optical engine 10 includes an optical synthesizer 70, LCD panels 60a, 60b, and 60c installed on three faces of the optical synthesizer 70, light guide plates 50a, 50b, and 50c respectively corresponding to rear surfaces of the LCD panels 60a, 60b, and 60c, and a plurality of light sources 51a, 51b, and 51c installed near upper sides and lower sides of the light guide plates 50a, 50b, and 50c. Also, polarizing plates 61a, 61b, and 61c are provided between the LCD panels 60a, 60b, and 60c and the optical synthesizer 70.

Figure 4:
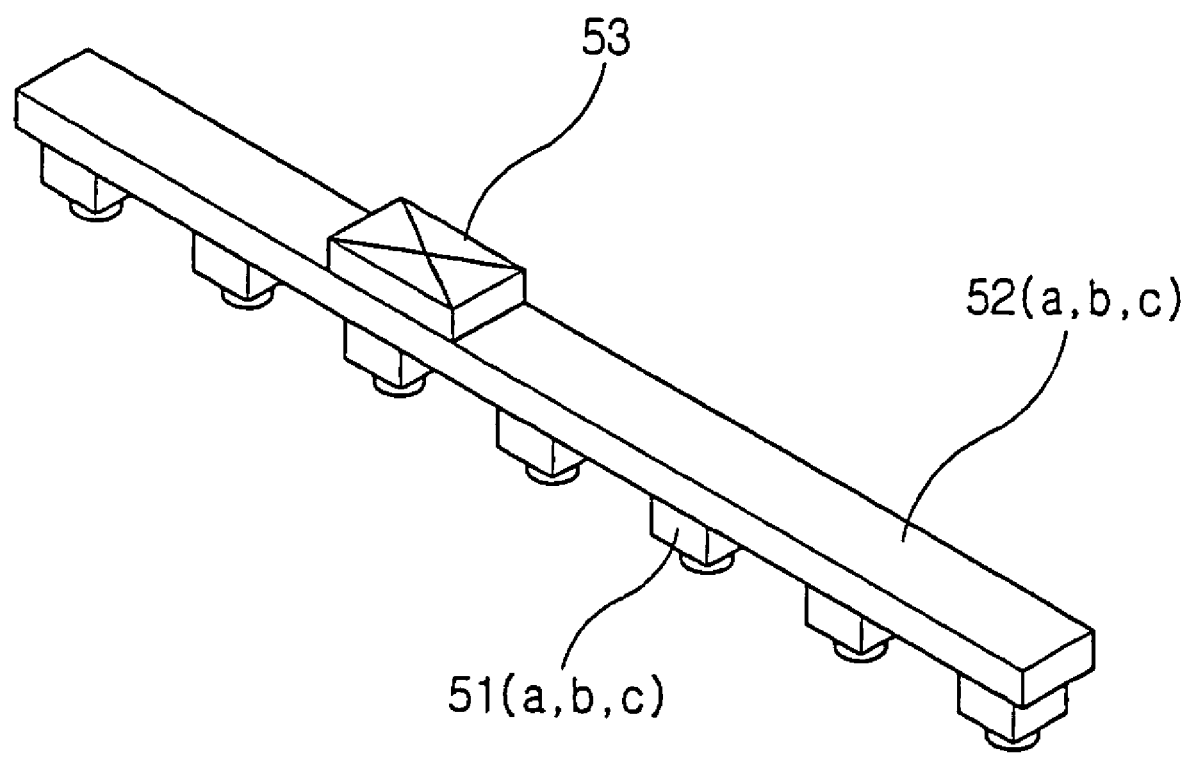
FIG. 4 is a perspective view illustrating a light source and a heat pipe of FIG. 2.

FIG. 4 is a partial perspective view illustrating the light sources 51a, 51b, and 51c and heat pipes 52a, 52b, and 52c (as shown in FIG. 3). Each of the heat pipes 52a has a light source 51a, 51b or 51c of a single color (red, green or blue). As illustrated in FIG. 4, the light sources 51a, 51b and 51c installed corresponding to the three faces of the optical synthesizer 70 each include a plurality of LEDs to emit the respective colored lights as an R-light source 51a, a G-light source 51b, and a B-light source 51c. The plurality of light sources 51a, 51b, and 51c are attached to the heat pipes 52a, 52b, and 52c shaped like a bar. The heat pipes 52a, 52b, and 52c are each installed with temperature sensors 53. The heat pipes 52a, 52b, and 52c are made of copper having high thermal conductivity and are filled with a small amount of liquid. The insides of the heat pipes 52a, 52b, and 52c have a low pressure to lower a boiling point of the liquid inside. Accordingly, the liquid in the heat pipes 52a, 52b, and 52c boils at a low temperature keeping a constant temperature across the heat pipes 52a, 52b, and 52c, regardless of positions of heat sources contacting the heat pipes 52a, 52b, and 52c.

Figure 5:
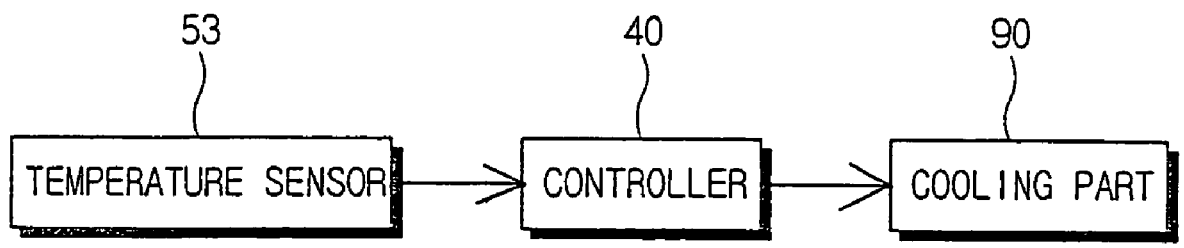
FIG. 5 is a flow diagram illustrating temperature control according to the projector of FIG. 2.

FIG. 5 is a block diagram illustrating a flow of a temperature control of the projector according to the embodiment of the present invention. As illustrated in the drawing, the temperature sensors 53 installed on the heat pipes 52a, 52b, and 52c transfer temperature information of the light sources 51a, 51b, and 51c to a controller 40, and then the controller 40 controls an operation of the cooling part 90 according to an optimized temperature previously inputted to control the temperature of the light sources 51a, 51b, and 51c.

Hereinbelow, an operation of the projector having the above configuration will be described. The lights from the light sources 51a, 51b, and 51c including LEDs of colored signals R, G, and B are emitted toward the light guide plates 50a, 50b, and 50c. The light guide plates 50a, 50b, and 50c transfer the lights emitted from the light sources 51a, 51b, and 51c to the LCD panels 60a, 60b, and 60c. The lights emitted from the light sources 51a, 51b, and 51c installed on the upper sides and lower sides of the light guide plates 50a, 50b, and 50c can be transferred to the rear surfaces of the LCD panels 60a, 60b, and 60c by the light guide plates 50a, 50b, and 50c.

The optical synthesizer 70 is shaped like a cube and synthesizes the lights from the LCD panels 60a, 60b, and 60c. The LCD panels 60a, 60b, and 60c control the lights emitted from the light sources 51a, 51b, and 51c having color signals R, G, and B to form the picture in the optical synthesizer 70. A projection lens 80 projects the synthesized picture. The polarizing plates 61a, 61b, and 61c provided between the LCD panels 60a, 60b, and 60c and the optical synthesizer 70 improve the straightness of the light.

The light sources 51a, 51b, and 51c thermally contact each other through the heat pipes 52a, 52b, and 52c. As described above, the heat pipes 52a, 52b, and 52c reduce a temperature deviation among the heat sources contacting the heat pipes 52a, 52b, and 52c because of their high thermal conductivity. Accordingly, the temperature deviation among the plurality of light sources 51a, 51b, and 51c is reduced by the heat pipes 52a, 52b, and 52c. Thus, a phase shift caused by a temperature difference among the light sources 51a, 51b, and 51c can be removed.

Additionally, the controller 40 controls an operation of the cooling part 90 to cool the heat radiated from the light sources 51a, 51b, and 51c using the temperature sensors 53 installed on the heat pipes 52a, 52b, and 52c. The high thermal conductivity of the heat pipes 52a, 52b, and 52c enables the temperature sensors 53 to detect the temperature of the light sources 51a, 51b, and 51c accurately. Accordingly, the controller 40 can keep the temperature of the light sources optimal according to the detected temperature by controlling the cooling part 90.

The embodiment of the present invention provides a projector having a simple structure, preventing the phase shift caused by temperature differences among a plurality of light sources and controlling the temperature of the plurality of light sources easily.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A projector comprising an optical engine, the optical engine comprising:
   an optical synthesizer;
   a plurality of display devices corresponding to the optical synthesizer;
   a plurality of light sources each in respective vicinities of the plurality of display devices to emit light;
   a light guide plate provided between each light source and each display device; and
   a heat pipe directly contacting the light sources to reduce a temperature deviation between the light sources.

2. The projector according to claim 1, wherein the optical engine further comprises:
   a temperature sensor installed on the heat pipe;
   a cooling part to cool the light sources; and
   a controller to control the cooling part according to a signal from the temperature sensor.

3. The projector according to claim 2, wherein each of the light sources comprises an LED.

4. The projector according to claim 2, wherein the optical synthesizer is shaped like a cube and three of the display devices are provided corresponding to respective faces of the optical synthesizer.

5. The projector according to claim 4, wherein each of the light sources comprises an LED.

6. The projector according to claim 1, wherein each of the light sources comprises an LED.

7. The projector according to claim 1, wherein the display devices are LCD panels.

8. The projector according to claim 7, further comprising a plurality of polarizing plates respectively between the LCD panels and the optical synthesizer.

9. The projector according to claim 1, wherein the heat pipe has a bar shape.

10. The projector according to claim 1, wherein the heat pipe has a liquid therein, and the liquid boils to keep a constant temperature across the heat pipe.

11. An optical engine, comprising:
 a plurality of display devices;
 a plurality of light sources to emit light respectively to the display devices; and
 a heat pipe directly contacting the light sources to reduce a temperature deviation between the light sources.

12. The optical engine according to claim 11, wherein the heat pipe has a liquid therein, and the liquid boils to keep a constant temperature across the heat pipe.

13. A method, comprising:
 detecting respective temperatures of a plurality of light sources;
 transferring the detected temperatures to a controller;
 directly contacting a cooling pipe to the light sources; and
 controlling an operation of the cooling pipe according to an optimized temperature to control the temperatures of the light sources.

14. The method according to claim 13, further comprising:
 providing a heat pipe in contact with the light sources; and
 boiling a liquid inside the heat pipe to reduce a temperature deviation between the light sources.

* * * * *